April 7, 1931.  H. E. BERGEN  1,799,948
FISH CUTTING MACHINE
Filed Sept. 23, 1927
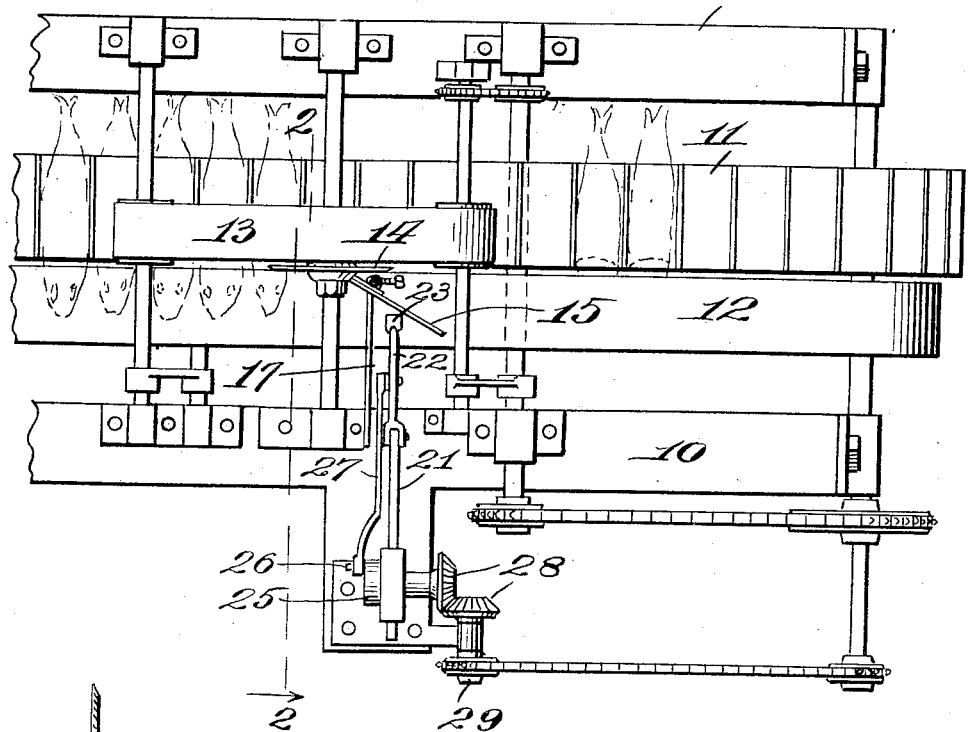
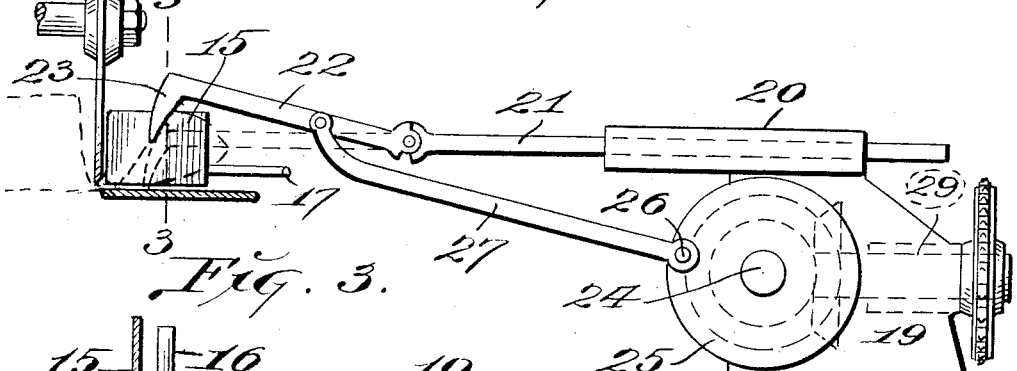
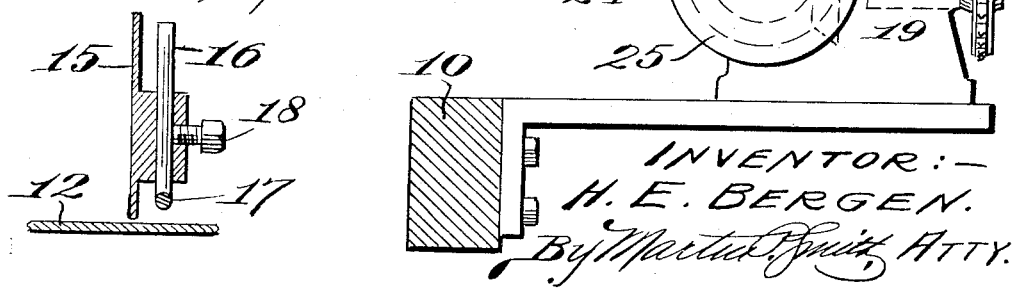
INVENTOR:—
H. E. BERGEN.
By Martin Smith, ATTY.

Patented Apr. 7, 1931

1,799,948

UNITED STATES PATENT OFFICE

HAROLD E. BERGEN, OF SAN FRANCISCO, CALIFORNIA

FISH-CUTTING MACHINE

Application filed September 23, 1927. Serial No. 221,599½.

My invention relates to improvements in fish cutting machines, and has for its principal object the provision of relatively simple, practical and efficient means removing the heads and entrails of the fish after the heads have been partially cut from the bodies.

It will be understood that there are a number of fish cutting machines now in general use which partially cut the heads from the bodies of the fish, thereby leaving the entrails connected to the heads so that as the heads are pulled away from the bodies the entrails are drawn out with the heads, and it is one of the objects of my invention to provide relatively simple and positively acting means that cooperates with these types of fish cutting machines for engaging and pulling the heads and entrails of the fish away from the bodies thereof.

With the foregoing and other objects in view, my invention consists in certain novel features of construction and arrangement of parts that will hereinafter be more fully described and claimed and illustrated in the accompanying drawing, in which—

Fig. 1 is a plan view of a standard type of fish cutting machine and showing my improved head and entrail removing device associated therewith.

Fig. 2 is an enlarged cross section taken approximately on the line 2—2 of Fig. 1.

Fig. 3 is an enlarged detail section taken approximately on the line 3—3 of Fig. 2.

Referring by numerals to the accompanying drawings which illustrate a practical embodiment of my invention, 10 designates the frame work of a standard frame of fish cutting machine, which machine includes a conveyor 11 that receives the bodies of the fish, a belt conveyor 12 that supports the heads of the fish when the latter are engaged by the rotary cutter, 13 a short pressure belt that operates immediately above the conveyor 11, adjacent to the rotary cutter 14 and which latter occupies a position between and immediately above the conveyors 11 and 12.

In the operation of this type of fish cutting machine the fish carried by conveyor 11 are successively engaged by the rotary cutting disc 14 that operates at high speed and the heads of the fish are partially severed from the bodies so that the entrails of the fish are uncut and remain connected to the heads.

My invention, which operates to positively engage the partially cut fish heads and separate the same and the connected entrails from the bodies, includes a vertically disposed deflector plate 15 that occupies an inclined position directly above belt 12 and immediately adjacent to the cutting disc 14. The inner forward edge of this plate occupies a position immediately adjacent to the outer face of disc 14, as illustrated in Fig. 2, and from this point the plate extends rearwardly and outwardly and terminates adjacent to the outer edge of belt conveyor 12. Plate 15 is supported by a post 16 that projects upwardly from the inner end of an arm 17 and which latter is fixed in any suitable manner to an adjacent part of the frame 10.

A set screw 18 is utilized for clamping the plate 15 to post 16, and when said screw is loosened the plate may be adjusted vertically on the post or shifted into various angular positions, and after such adjustment locked to the post by tightening the set screw. (See Fig. 3.)

Mounted on frame 10 to the side of plate 15 is a bracket 19 on top of which is formed a bearing 20 for a reciprocating rod 21, and pivotally connected to the inner end of this rod is a short arm 22 that overlies belt conveyor 12, and the outer end of this arm terminates in a depending hook 23.

Journaled in bracket 19 is a shaft 24 on which is fixed a disc 25, and projecting from the face of said disc is a wrist pin 26. Journaled on this wrist pin is one end of a pitman 27, the opposite end of which is pivotally connected to the rear portion of arm 22.

Shaft 24 is connected by beveled gearing 28 to a shaft 29 that is journaled on bracket 19, and said shaft being driven in any suitable manner from one of the shafts of the fish cutting machine.

The operation of my improved fish head and entrail removing device is as follows:

As the fish heads are partially cut from the bodies the heads are engaged against the inner vertical edge of plate 15, and as the bodies are carried along by conveyor 11, the partially cut heads will be forced outward by engagement with the inclined plate 15, and after said heads have been drawn outwardly a short distance they will be engaged by the hook 23 on arm 22 and as the latter is drawn outwardly the engaged head will be broken away from the body and the head and attached entrails will be drawn outwardly across belt conveyor 12 to discharge over the outer edge thereof into a suitable receptacle.

As shaft 29 is rotated the gearing 28 drives shaft 24 and as disc 25 rotates the pitman 27 will impart reciprocating movement to arm 22 and rod 21, the latter sliding through its bearing 20, and due to change in position of the wrist pin during its travel and the fact that rod 21 reciprocates in a fixed path, the arm 22 provided at its outer end with hook 23, will swing vertically during its reciprocating movement. Thus the forward end of arm 22 will be elevated so that the hook will pass over a fish head that has been drawn outward by plate 15 during the travel of the arm 22 toward the inclined plate and on the outward travel of the arm the latter will swing downward so as to engage the head and pull the same and the connected entrails away from the body, thereby achieving the desired results.

Thus it will be seen that I have provided a relatively simple, efficient and positively acting means for engaging the partially severed heads of fish and drawing the same with the connected entrails away from the bodies, and which head and entrail removing means may be conveniently associated with the now generally used types of fish cutting machines.

It will be readily understood that minor changes in the size, from and construction of the various parts of my improved fish cutting machine may be made and substituted for those herein shown and described without departing from the spirit of my invention, the scope of which is set forth in the appended claim.

I claim as my invention—

The combination with a fish cutting machine employing a conveyor and a rotary cutter arranged for operation adjacent to one edge of said conveyor, of a bracket located on the opposite side of the conveyor from the cutter, a rod mounted for reciprocatory movement in said bracket, a hook hinged to the inner end of said reciprocating rod and adapted to move transversely across the conveyor as the rod is reciprocated, a disk mounted for rotation on the bracket, a pitman pivotally connected to said disk and to said hook, means for imparting rotary movement to the disk and an inclined plate adjustably mounted above the conveyor adjacent to the path of travel of said hook.

In testimony whereof I affix my signature.

HAROLD E. BERGEN.